Figure 1:
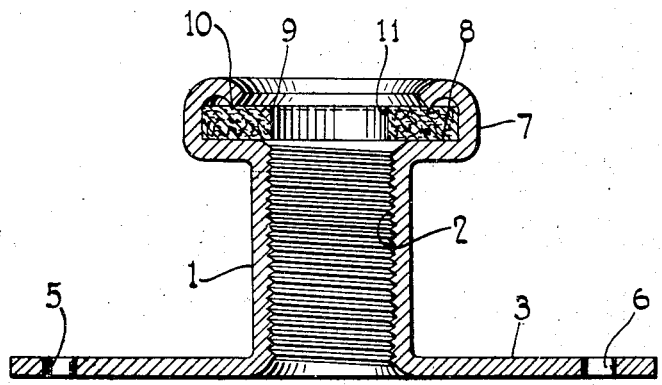

June 8, 1943.    R. W. LUCE    2,321,497
THREADED LOCKING DEVICE
Original Filed Aug. 4, 1939

INVENTOR.
Richard W. Luce
BY George T. Gill
ATTORNEY

Patented June 8, 1943

2,321,497

UNITED STATES PATENT OFFICE 2,321,497

THREADED LOCKING DEVICE

Richard W. Luce, Southport, Conn.

Original application August 4, 1939, Serial No. 288,266, now Patent No. 2,265,661, dated December 9, 1941. Divided and this application May 8, 1941, Serial No. 392,429

3 Claims. (Cl. 151—7)

This application constitutes a division of my co-pending application Serial No. 288,266, filed August 4, 1939, for Threaded locking device.

The invention herein disclosed relates to a threaded locking device of the kind in which a resilient, fibrous washer is used to engage the threads of a bolt entered therein in frictional engagement and exert an axial force between the thread of the threaded locking device and the thread of a bolt or screw entered therein.

Since one of the functions of such threaded locking devices is to remain secure under the action of forces resulting from vibration, it is important that the weight of the locking-device be as small as possible and that the weight be distributed such that the center of the mass be as close as possible to the axis of rotation. The moment of inertia of such a device is proportional to the mass of the device and the radius of gyration. In consequence, any reduction in the mass of the device and any distribution of the mass to bring the center of the mass closer to the axis of rotation, the axis of the threaded locking device, lessens the force tending to rotate the locking device relative to the screw. A reduction in the weight of such devices is also important where such devices are used in airplane construction, as any reduction in the weight of the constructional elements of an airplane increases the load-carrying capacity accordingly.

By the invention herein disclosed, there is provided a threaded locking device of the kind mentioned which has a relatively thin wall section. The threaded locking device of this invention is preferably stamped and drawn from sheet metal and has a relatively thin, substantially uniform wall thickness throughout. The weight of the locking device and its moment of inertia are thus materially reduced without affecting its efficacy as a locking device or its holding power.

Such a threaded locking device, constituting an example of one specific embodiment of the invention, is disclosed in the accompanying drawing and described in detail below.

The drawing includes:

Fig. 1 which is a longitudinal section of a threaded locking device; and

Figure 2:
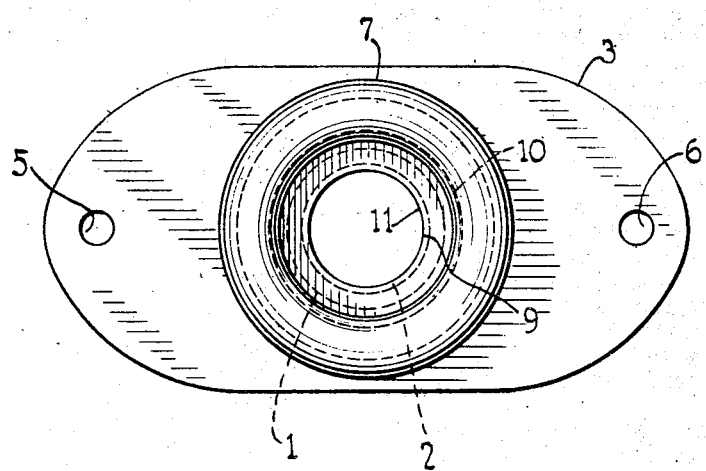

Fig. 2 which is a plan of the same.

The particular, specific, threaded locking device illustrated in the drawing by way of example is of the type that is commonly referred to as an anchor nut. This nut is stamped and drawn from sheet metal and includes a tubular body portion 1 having the load-carrying threads 2 therein. At one end of the body portion there is provided a flange 3, shaped as shown and extending at right angles to the axis of the nut. The surface 4 of this flange constitutes the face of the nut. The flange is pierced to provide openings 5 and 6 through which rivets may extend to secure the nut to some part of a structure with the face of the nut against the structure to which the nut is secured.

At the other end of the body portion, the diameter of the blank is enlarged to form a tubular portion 7 of enlarged diameter and to form a shoulder 8. In this portion of enlarged diameter there is placed a non-metallic washer 9, preferably a resilient, fibrous washer. The fibrous washer rests on the shoulder 8 and the end section of the portion 7 is spun over to clamp the washer between the edge 10 thereof and the seat or shoulder 8.

The opening 11 through the fibrous washer 9 is slightly less in diameter than the thread diameter of the body portion 1. As a bolt is entered in the nut, it passes through the body portion and then engages the washer 9. This washer is not threaded and the bolt must emboss its thread in the washer. In entering the washer it causes the washer to bend axially, the action being a bending action in the nature of a cantilever. This bending action exerts a resilient force between the nut and the bolt entered therein and causes the surface of the thread of the body portion 1 of the nut to engage the surface of the thread of the bolt in frictional engagement. The frictional engagement between the threads so effected and the clamping action effected by the fibrous washer are adequate to maintain the nut on the bolt and prevent relative movement of the nut with respect to the bolt due to forces resulting from vibration.

From the foregoing description of the embodiment of the invention illustrated in the drawing, it will be seen that by this invention there is provided a threaded locking device of the kind described that is light in weight and that has a relatively thin and uniform wall section. While a nut of the type commonly termed an anchor nut, is disclosed any form of nut, such as the hexagonal nut of the aforesaid co-pending application may be made embodying the invention.

It will be obvious that various changes may be made by those skilled in the art in the details of the embodiment of the invention illustrated in the drawing and described in detail above within the principle and scope of the invention as expressed in the appended claims.

I claim:

1. A threaded locking device of the kind having a non-metallic washer with a hole therethrough of a diameter less than the root diameter of the thread, the device being characterised by the fact that it is of sheet metal of relatively thin and substantially uniform wall section and includes a threaded tubular portion, means united at one end of the threaded tubular portion for retaining the non-metallic washer axially alined with the threaded tubular portion and restrained against rotation with respect thereto, and a flange portion united at the opposite end of the threaded tubular portion forming a face for the threaded locking device extending substantially perpendicular to the axis of the threaded tubular portion.

2. A threaded locking device of the kind having a non-metallic washer with a hole therethrough of a diameter less than the root diameter of the thread, the device being characterised by the fact that it is of sheet metal of relatively thin and substantially uniform wall section and includes a threaded tubular portion, another tubular portion at one end of the threaded tubular portion for receiving the non-metallic washer, said latter tubular portion retaining the non-metallic washer axially alined with the threaded tubular portion and restrained against rotation with respect thereto, and a flange portion at the opposite end of the threaded tubular portion forming a face for the threaded locking device extending substantially perpendicular to the axis of the threaded tubular portion.

3. A threaded locking device of the kind having a non-metallic washer with a hole therethrough of a diameter less than the root diameter of the thread, the device being characterised by the fact that it is of sheet metal of relatively thin and substantially uniform wall section and includes a threaded tubular portion, another tubular portion of greater length than the thickness of the non-metallic washer and in which the washer is received, the end of said tubular portion being rolled over on the washer to retain the washer and restrain the washer against rotation with respect thereto, and a flange portion at the opposite end of the threaded tubular portion forming a face for the threaded locking device extending substantially perpendicular to the axis of the threaded tubular portion.

RICHARD W. LUCE.